United States Patent [19]
Amick et al.

[11] Patent Number: 5,314,977
[45] Date of Patent: May 24, 1994

[54] GRAFT COPOLYMERS PREPARED BY TWO STAGED AQUEOUS EMULSION POLYMERIZATION

[75] Inventors: David R. Amick, Doylestown; William D. Emmons, Huntingdon Valley; Dennis P. Lorah, Lansdale, all of Pa.

[73] Assignee: Rohm and Haas Company, Philadelphia, Pa.

[21] Appl. No.: 71,902

[22] Filed: Jun. 3, 1993

Related U.S. Application Data

[62] Division of Ser. No. 722,562, Jun. 27, 1991, Pat. No. 5,247,040.

[51] Int. Cl.$^5$ .................. C08F 257/02; C08F 259/02; C08F 263/02; C08F 265/04; C08F 291/14; C08F 271/02; C08L 51/00

[52] U.S. Cl. ..................... 526/286; 525/274; 525/279; 525/291; 525/296; 525/302; 525/309; 525/317; 525/64; 525/70; 525/212; 526/263; 526/287; 526/303.1; 526/328; 526/329.7; 526/341; 526/343; 526/344; 106/287.32

[58] Field of Search ............... 525/291, 309, 64, 70, 525/212; 526/286, 328, 329.7; 106/287.32

[56] References Cited

U.S. PATENT DOCUMENTS

| | | |
|---|---|---|
| 3,390,206 | 6/1968 | Thompson et al. . |
| 3,503,940 | 3/1970 | Oswald . |
| 3,862,102 | 1/1975 | Mikovich et al. . |
| 4,937,297 | 6/1990 | Dean . |
| 5,028,677 | 7/1991 | Janowicz . |
| 5,064,495 | 11/1991 | Omura et al. . |

FOREIGN PATENT DOCUMENTS

| | | |
|---|---|---|
| 572522 | 3/1959 | Canada . |
| 429701 | 6/1991 | European Pat. Off. . |
| 289293 | 5/1989 | Japan . |
| 148202 | 12/1989 | Japan . |

OTHER PUBLICATIONS

Graft Polymers with Macromonomers, I. Synthesis from Methacrylate-Terminated Polystryene, G. O. Schultz and R. Milkovich, Journal of Applied Polymer Science, vol. 27, 4473-4486 (1982).

Primary Examiner—Vasu S. Jagannathan
Attorney, Agent, or Firm—James G. Vouros

[57] ABSTRACT

This invention relates to a two stage aqueous emulsion polymerization process for making graft copolymers. In the first stage, at least one first ethylenically unsaturated monomer is polymerized in the presence of at least one mercapto-olefin compound to form a macromonomer with terminal functional groups. In the second stage, at least one second ethylenically unsaturated monomer is polymerized in the presence of the macromonomer such that a copolymer is formed with a backbone of polymerized units of the at least one second ethylenically unsaturated monomer and side chains of the macromonomer.

24 Claims, No Drawings

GRAFT COPOLYMERS PREPARED BY TWO STAGED AQUEOUS EMULSION POLYMERIZATION

This is a divisional of application Ser. No. 722,562, filed Jun. 27, 1991 now U.S. Pat. No. 5,247,040.

FIELD OF THE INVENTION

This invention relates to a method of making graft copolymers, to the graft copolymers made by this method, to polymer emulsion compositions made by this method and to novel graft copolymers. Specifically, this invention relates to a two stage aqueous emulsion polymerization where, in the first stage, a macromonomer is prepared by the polymerization of at least one ethylenically unsaturated monomer in the presence of a mercapto-olefin compound, followed by the polymerization in the second stage of terminal ethylenically unsaturated groups on the macromonomer with at least one ethylenically unsaturated second monomer to form graft copolymers.

BACKGROUND OF THE INVENTION

Graft copolymers are defined as the macromolecule formed when polymer or copolymer chains are chemically attached as side chains to a polymeric backbone. Generally, the side chains are of different composition than the backbone chain. Due to the ability to chemically combine unlike polymeric segments in one molecule, graft copolymers have unique properties, making them useful for their surface active properties, particularly in stabilizing physical blends of otherwise incompatible polymers.

"Macromonomers," as used herein, are defined as polymers or copolymers having relatively low molecular weight, such as an oligomer; having a functional group at the terminal portion of the chain; and are capable of free radical polymerization. Macromonomers have found use in surface coatings, adhesives, plasticizers and surface active agents. The graft copolymer products of the present invention combine the desirable properties of the macromonomers formed in stage one of the polymerization with desirable properties of the polymer or copolymer formed in stage two of the polymerization.

The copolymer products of the present invention can be used directly in water-based emulsion coatings, elastomers, adhesives, caulks and mastics. Still further uses for these copolymer are as plastic additives for use as compatibilizers of polymer-polymer blends.

Macromonomers capable of undergoing free radical polymerization have traditionally been prepared in organic solvents by a two-step process. First an end-functional oligomer is prepared. This is then followed by the conversion of the terminal functionality on the oligomer into a new, free radical-polymerizable functionality. Once these macromonomers have been formed, they can be polymerized with other monomers to yield a graft copolymer, whereby the macromonomer forms side chains on a polymer backbone formed from the other monomers. Similar to the formation of the macromonomer, this graft copolymerization is usually carried out in organic solvents, as exemplified in U.S. Pat. No. 3,390,206.

Milkovich and Schulz have demonstrated (J. of Applied Polymer Science, Vol. 27, 4473-4486 (1982)) that polystyrene macromonomers prepared in an organic solvent, can then be dissolved in backbone comonomer, emulsified and polymerized by a free radical aqueous emulsion polymerization process. The macromonomers can be used with or without its solvent removed.

A key drawback to these graft copolymerizations is that organic solvent is a necessary component and must be removed at some point if a solvent-free product is desired. In addition, in the approach used by Milkovich et al., the macromonomers formed in an organic solvent do not emulsify well and therefore lead to a final aqueous dispersion of polymers in the form of large particles (1–5 microns). This is also undesirable because the large particles settle rapidly and therefore do not form a stable dispersion.

Japanese Patent Application 62-289293 discloses a process for the production of a macromonomer and conversion of the macromonomer into a graft copolymer in the form of an aqueous suspension. These macromonomers are produced by first forming a prepolymer with terminal functional groups, such as carboxyl groups. This prepolymer is formed, in the absence of organic solvent, by the polymerization of a vinyl monomer in the presence of a mercapto-acid type chain transfer agent, such as mercapto acetic acid. The chain transfer agent imparts the carboxyl group functionality onto the terminal portion of the prepolymers. This prepolymer is preferably made by an aqueous suspension process, and then isolated in a step that requires removal of the water. Alternately, the prepolymer can be made by a bulk polymerization process. An emulsion polymerization process is stated to suffer from low chain transfer efficiency of the mercapto-acid chain transfer agent.

The dry prepolymer is then dissolved in vinyl monomer and reacted with a second compound containing both a vinyl group and a functional group reactive with the terminal functional group on the prepolymer. The reaction is inhibited so that the vinyl monomer used as the solvent and the vinyl portion of the second compound do not polymerize. The reaction of the prepolymer with the second compound is a necessary step to impart vinyl functionality onto the macromonomer. The macromonomer/vinyl monomer solution can then be polymerized by a bulk process or by a suspension process. It is stated that an emulsion polymerization process isn't useful because the emulsion stability of the macromonomer/vinyl monomer solution "is not very good".

Japanese Patent Application 63-148202 discloses a method for producing graft copolymers utilizing an aqueous emulsion polymerization process. A macromonomer is dissolved in vinyl monomer, and this solution is emulsified and then polymerized. The macromonomer can be made by any of the two-step procedures known in the prior art, most of which utilize solvent, and then the macromonomer is dissolved in vinyl monomer. Emulsification of the macromonomer/vinyl monomer solution is extremely difficult and requires the use of very specific surfactants or pairs of surfactant, in conjunction with emulsification via a homogenizer or ultrasonic waves. The process is energy intensive and provides aqueous dispersions with average particle size of 480 nm.

The present invention is unlike the process of Japanese Patent Application 63-148202 in several respects. First, the ethylenically unsaturated groups on the terminal portion of the macromonomers formed during stage one of the present invention are directly attached to the macromonomer in a single step. No post-functionalization step is needed. Second, the macromonomer is readily made in the absence of solvent. Third, the macromonomer formed during stage one of the present invention is already in the desired form of a stable, small particle size dispersion and therefore does not require having to be isolated, dissolved in stage-two monomer, and emulsified, to achieve that form. Also, the dispersion of the present invention is prepared utilizing common surfactants, and does not require homogenization. Fourth, the final graft polymers of the present invention are in the form of a small particle size dispersion (100 nm is easily achieved) which is completely stable to settling. The process of Japanese Patent Application 63-148202 still produces relatively large (480 nm) particles, which are somewhat unstable and slowly settle.

SUMMARY OF THE INVENTION

The present invention provides a two stage aqueous emulsion polymerization where, in the first stage, a macromonomer is prepared by the polymerization of at least one ethylenically unsaturated monomer in the presence of a mercapto-olefin compound, followed by the polymerization in the second stage of terminal ethylenically unsaturated groups on the macromonomer with at least one ethylenically unsaturated second monomer to form graft copolymers.

DETAILED DESCRIPTION OF THE INVENTION

The present invention is an aqueous emulsion polymerization process leading to the formation of macromonomers and subsequent formation of graft copolymers. These graft copolymers are prepared by a two stage aqueous emulsion polymerization. In the first stage a macromonomer is synthesized by the polymerization of at least one ethylenically unsaturated monomer in the presence of at least one mercapto-olefin compound.

The ethylenically unsaturated monomer useful for the preparation of the macromonomer can be any ethylenically unsaturated monomer, for example; acrylate esters and acids; methacrylate esters and acids; acrylonitrile; methacrylonitrile; acrolein; methacrolein; vinyl aromatic compounds such as styrene, substituted styrene, vinyl pyridine and vinyl naphthalene; vinyl esters of organic acids, such as vinyl acetate; N-vinyl compounds such as N-vinyl pyrrolidone; unsaturated halogenated compounds such as vinyl chloride and vinylidene chloride; acrylamide, methacrylamide and substituted acrylamides and metacrylamides; polymerizable sulfonic acids and salts thereof such as styrene sulfonic acid, sodium vinyl sulfonate, sulfoethyl acrylate, sulfoethyl methacrylate and acryloamidopropanesulfonic acid; vinyl ethers; or combinations thereof. The preferred composition of the macromonomer is a copolymer of acrylate and methacrylate, with or without styrene.

In the preparation of the macromonomer in the first stage of the aqueous emulsion polymerization, at least one mercapto-olefin compound is present. The mercapto-olefin compound contains at least two reactive functional groups. The at least one first functional group is a mercapto group which functions as a chain transfer site during polymerization with an ethylenically unsaturated group of the monomers present. The olefin portion, or the ethylenically unsaturated group of the mercapto-olefin compound does not polymerize, or only polymerizes to a limited extent, with ethylenically unsaturated group of the monomers. Therefore, the macromonomer formed in this first stage contains terminal ethylenically unsaturated groups bonded to the macromonomer via a mercaptan linkage.

The mercapto-olefin can be any compound containing at least one mercapto group and at least one site of ethylenic unsaturation. Examples of such compounds include;

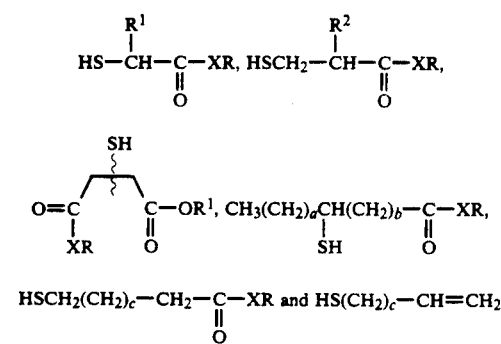

where X is O or NR$^1$,
R$^1$ is H, or a C$_1$ to C$_{18}$ alkyl (linear or branched),
R is —(CH$_2$)$_c$CR$^2$=CHR$^3$, —(CH$_2$)$_e$CH$_3$,

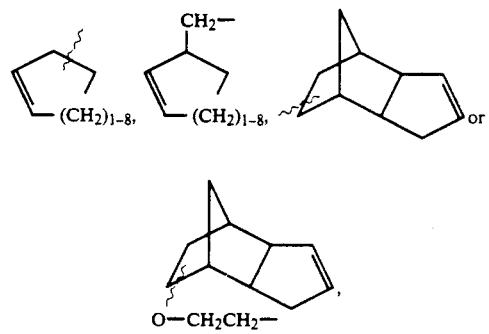

R$^2$ and R$^3$ are H or CH$_3$,
a+b is from 0 to 16,
c is from 1 to 16,
d+e is from 1-15, and the bond shown as: ⌇ , indicates attachment to any saturated carbon on the structures shown.

The more preferred mercapto-olefins are allylmercapto propionate, allylmercapto acetate, crotylmercapto propionate, and crotylmercapto acetate. The mercapto-olefin compound is contained in the first stage of the aqueous emulsion polymerization at a concentration of from about 0.5% to about 20%, and more preferable from about 1.0% to about 5.0%, based on the total weight of the monomers in stage one.

The degree of polymerization (DP) of the macromonomer side chain can be in the range of 5 to 500, more preferably in the range of 20-200. "Backbone" molecular weights will be high, up to several hundred thousand, as is typical for emulsion polymers. However, this can be lowered, as desired, by adding chain transfer agents, such as thiols, during the stage-two polymerization.

Once the macromonomer has been formed, it can be isolated, for example by spray drying, used as is, or stored for further reaction at a later time. However, it is highly preferred the second stage monomer emulsion be added directly to the macromonomer emulsion of stage one to form a graft copolymer. One of the key advantages of this process is that the macromonomer does not have to be isolated and stage two can take place simply by adding stage two monomer.

In stage two of the aqueous emulsion polymerization, an aqueous emulsion containing at least one additional ethylenically unsaturated monomer is added to the reaction mixture containing the macromonomer formed during the stage one polymerization. The second stage monomers polymerize, forming the backbone portion of the copolymer. In addition, during the polymerization of the second stage monomer, the ethylenically unsaturated groups on the terminal portion of the macromonomer formed in stage one polymerize with the ethylenically unsaturated groups of the second stage monomers, forming side chains of the macromonomer on the backbone polymer.

The at least one second monomer can be any of the ethylenically unsaturated monomers listed above for use as in the macromonomer.

Preparation of the final graft copolymer is improved by utilizing polymerization conditions that minimize olefinic reactivity of the macromonomer during its preparation in stage one, but maximize the olefinic reactivity during backbone preparation in stage two. The olefinic reactivity can be increased, for example, by selecting an ethylenically unsaturated second monomer or monomers having a high propensity for polymerizing with olefins, or by maintaining a low level of in-process monomer, or a combination thereof. These strategies, exemplified in the examples, are well known to those skilled in the art. Also, during stage two polymerization, a portion of the macromonomer may not become incorporated into the graft copolymer.

The final graft copolymer is composed of from about 10 to 90, more preferably from about 30 to 70 weight percent, based on the total weight of the graft copolymer, of polymerized units derived from the at least one first monomer (the macromonomer side chain) and from about 10 to 90, more preferably 30-70 weight percent, based on the total weight of the graft copolymer, of polymerized units derived from the at least one second monomer (the backbone).

The copolymer compositions are prepared by aqueous emulsion copolymerization techniques well known to those skilled in the art. The aqueous emulsion copolymerization technique of the present invention is based on a two stage polymerization and gradual or one-shot addition of monomer in each of the two stages. It is preferable to add the monomer in stage one in a single addition and to gradually add the monomer during stage two. The temperature of the reaction in each of the two stages should be in the range of from about room temperature to about 150° C., more preferably from about 50° to 95° C.

An emulsifier can be used in the process of the present invention and can be of the general type of an anionic, cationic, or nonionic emulsifier. The more preferred emulsifiers are the anionic emulsifiers, such as sulfates and sulfonates, like sodium lauryl sulfate and sodium dodecyl benzene sulfonate. The amount of emulsifier used may be from about 0.05 to 10%, and more preferably from about 0.3 to 3%, based on the total weight of the monomers. Many other emulsifiers can be used and are well known in the emulsion polymerization art.

The latex particle size should be relatively small, 500 nanometers (nm) or less, and more preferably from about 50 to 200 nm. As is well known particle size is controlled primarily by the type and level of emulsifier used.

It is advantageous to initiate and catalyze the reaction in each of the two stages in a conventional manner. Any commonly known free radical generating initiators can be used, such as persulfates, peroxides, hydroperoxides, peresters and azo compounds. Specific examples are benzoyl peroxide, tert-butyl hydroperoxide, azodiisobutyronitrile and sodium, potassium and ammonium persulfates. The more preferred are the sodium, potassium and ammonium persulfates which can be used by themselves, activated thermally, or in a redox system. When used in a redox system, reducing agents such as sodium formaldehyde sulfoxylate, isoascorbic acid and sodium bisulfite can be used along with a promoter, such as for example iron or others well known to those skilled in the art. Thermal initiation is more preferred. The amount of initiator will generally be in the range of from about 0.1 to 3.0% by weight, based on the total weight of the monomers.

Additional initiator or catalyst systems may be added after the stage two polymerization to reduce any residual monomer.

Generally, the aqueous dispersion formed containing the graft copolymer has a solids level of from about 10% to about 60%, based on the total weight of the aqueous composition. The graft copolymer product of this aqueous emulsion polymerization can be isolated, for example, by spray drying or coagulation. However, it is preferable to use the aqueous emulsion containing the graft copolymer as is.

The invention will now be illustrated by the following non-limiting examples.

EXAMPLE 1

A graft copolymer having a backbone composition of 55 wt. % of 99 parts ethyl acrylate/1 part methacrylic acid and a side chain composition of 45 wt. % of 99 parts methyl methacrylate/1 part methacrylic acid was prepared. (Side chain degree of polymerization (DP) 100 by using 1.44 wt. % allylmercapto propionate as chain transfer agent).

A reaction kettle was initially charged with 500.0 g. water, a solution of 0.37 g. ammonium persulfate in 25.0 g. water, a solution of 0.75 g. sodium carbonate in 10.0 g. water and a dispersion of 54.0 g. (33% Solids) of a 42 nm polymer seed. The kettle was then heated to 82° C. and a first monomer emulsion was added over a period of one hour while maintaining the temperature at 82° C. This first monomer emulsion, used to form the macromonomer side chain composition, contained 70.0 g. water, 3.8 g. of surfactant (30% aqueous solution of Aerosol ® A-103 surfactant), 247.5 g. methyl methacrylate, 2.5 g. methacrylic acid, 3.6 g. allylmercapto propionate and 25.0 g. monomer emulsion rinse water.

Once the addition of the first monomer emulsion was completed, an initiator solution of 0.75 g. ammonium persulfate in 50 g. water was added to the kettle. Then a second monomer emulsion was added to the reaction kettle over a period of two hours while the temperature was maintained at 82° C. In addition, another feed of an initiator solution of 0.75 g. ammonium persulfate in 50 g. water was started at the same time as the second monomer emulsion and also fed into the kettle over two hours. The second monomer emulsion used to form the backbone portion of the copolymer contained 100.0 g. water, 3.8 g. of surfactant (30% aqueous solution of Aerosol® A-103 surfactant), 302.6 g. ethyl acrylate, 3.0 g. methacrylic acid, and 25.0 g. monomer emulsion rinse water.

When the feeds were completed, the temperature of the reaction mixture was maintained at 82° C. for 30 minutes and then cooled to room temperature. The reaction product had a solids level of 38.6%, a pH of 5.8, and a particle size of 141 nm.

EXAMPLE 2

A graft copolymer having a backbone composition of 55 wt. % of 99 parts butyl acrylate/1 part methacrylic acid and a side chain composition of 45 wt. % of 99 parts methyl methacrylate/1 part methacrylic acid was prepared (side chain DP 100).

The same procedure was followed as in Example 1, except butyl acrylate was substituted for ethyl acrylate in the second monomer emulsion. The reaction product had a solids level of 38.7%, a pH of 5.8 and a particle size of 143 nm.

EXAMPLE 3

A graft copolymer having a backbone composition of 55 wt. % of 99 parts ethyl acrylate/1 part methacrylic acid and a side chain composition of 45 wt. % of 99 parts styrene/1 part methacrylic acid was prepared (side chain DP 100).

The same procedure was followed as in Example 1, except styrene was substituted for methyl methacrylate in the first monomer emulsion. In addition, the first monomer emulsion was fed into the kettle for a period of two hours instead of one hour. The reaction product had a solids level of 38.7%, a pH of 5.7 and a particle size of 146 nm.

EXAMPLE 4

A graft copolymer having a backbone composition of 55 wt. % of 99 parts butyl acrylate/1 part methacrylic acid and a side chain composition of 45 wt. % of 99 parts styrene/1 part methacrylic acid was prepared (side chain DP 100).

The same procedure was followed as in Example 1 except styrene was substituted for methyl methacrylate in the first monomer emulsion and butyl acrylate was substituted for ethyl acrylate in the second monomer emulsion. In addition, the first monomer emulsion was fed into the kettle for a period of two hours instead of one hour. The reaction product had a solids level of 38.9%, a pH of 5.8 and a particle size of 148 nm.

EXAMPLE 5

A graft copolymer having a backbone composition of 66.7 wt. % of 99.75 parts vinyl acetate/0.25 parts sodium vinyl sulfonate and a side chain composition of 33.3 wt. % of 99 parts butyl acrylate/1 part methacrylic acid was prepared. (Side chain DP 16 by using 7.3 wt. % allylmercapto propionate as chain transfer agent).

This graft copolymer was prepared by preparing a first monomer emulsion containing 67.6 g. water, 2.5 g. sodium lauryl sulfate, 247.5 g. butyl acrylate, 2.5 g. methacrylic acid, 18.3 g. allylmercapto propionate and 50.0 g. monomer emulsion rinse water.

A reaction kettle was then initially charged with 454.9 g. water, a solution of 0.7 g. ammonium persulfate in 25.0 g. of water, and a dispersion of 84.2 g. (33% solids) of a 42 nm polymer seed. The kettle was then heated to 85° C. and 16.9 g. of the first monomer emulsion was combined with 1.3 g linseed oil fatty acid and added to the kettle. After a two minute delay, the remainder of the first monomer emulsion was added over a period of one hour while maintaining the temperature at 85° C. Once the addition of the first monomer emulsion was completed, the temperature was maintained at 85° C. for an additional hour and then the reaction mixture was allowed to cool to 74° C. During this cooling, a solution of 2.0 g. sodium acetate in 100.0 g. water, a solution of 0.4 g sodium bisulfite in 50 g. water, a solution of 0.9 g. ammonium persulfate in 50 g. water, and 22.5 g. ferrous sulfate heptahydrate (0.15% in water) were added to the kettle; this was followed by the addition of a second monomer emulsion over a period of two hours. The temperature was maintained at 74° C. Simultaneously to the addition of the second monomer emulsion, feeds of initiator solutions of 3.2 g. t-butyl hydroperoxide, 2.4 g. ammonium persulfate in 160.0 g. water and of 3.6 g. sodium metabisulfate in 160.0 g. water were also added into the kettle. The second monomer emulsion used to form the backbone portion of the copolymer contained 118.0 g. water, 10.6 g. of a surfactant (a 58% aqueous solution of Alipal CO-436® surfactant), 2.2 g. sodium acetate, 1.0 g. acetic acid, 498.75 g. vinyl acetate, 5.0 g. sodium vinyl sulfonate (25%).

After two hours, when the feeds were completed, the temperature of the reaction mixture was maintained at 74° C. for 30 minutes and then cooled 65° C. Two additions of a solution of 0.5 g. t-butyl hydroperoxide (70% in water) in 5.0 g. water and a solution of 0.25 g. sodium formaldehydesulfoxylate in 5.0 g. water were added ten minutes apart. The kettle was allowed to cool to room temperature.

The reaction product had a solids level of 23.1%, a pH of 4.25, and a particle size of 145 nm.

EXAMPLE 6

A graft copolymer having a backbone composition of 66.7 wt. % of 79.75 parts vinyl acetate/20 parts butyl acrylate/0.25 parts sodium vinyl sulfonate and a side chain composition of 33.3 wt. % of 99 parts butyl acrylate/1 part methacrylic acid was prepared. (side chain DP 16).

The same procedure was followed as in Example 5 except 398.75 g. vinyl acetate and 100 g. butyl acrylate were substituted for the 498.75 g. of vinyl acetate in the second monomer emulsion. The reaction product had a solids level of 36.2%, a pH of 4.35 and a particle size of 135 nm.

EXAMPLE 7

A graft copolymer having a backbone composition of 50 wt. % of 99.75 parts vinyl acetate/0.25 parts sodium vinyl sulfonate and a side chain composition of 50 wt. % of 99 parts butyl acrylate/1 part methacrylic acid was prepared. (Side chain DP 160 by using 0.73 wt. % allylmercapto propionate as chain transfer agent).

This graft copolymer was prepared by preparing a first monomer emulsion containing 67.6 g. water, 2.5 g. sodium lauryl sulfate, 247.5 g. butyl acrylate, 2.5 g. methacrylic acid, 1.83 g. allylmercapto propionate and 50.0 g. monomer emulsion rinse water.

A reaction kettle was then initially charged with 454.9 g. water, a solution of 0.7 g. ammonium persulfate in 25.0 g. of water, and a dispersion of 84.2 g. (33% Solids) of a 42 nm polymer seed. The kettle was then heated to 85° C. and 16.9 g. of the first monomer emulsion was combined with 1.3 g. linseed oil fatty acid and added to the kettle. After a two minute delay, the remainder of the first monomer emulsion was added over a period of one hour while maintaining the temperature at 85° C. Once the addition of the first monomer emulsion was completed, the temperature was maintained at 85° C. for an additional hour and then the reaction mixture was allowed to cool to 74° C. During this cooling, a solution of 2.0 g. sodium acetate in 100.0 g. water, a solution of 0.4 g sodium bisulfite in 50 g. water, a solution of 0.9 g. ammonium persulfate in 50 g. water, and 22.5 g. ferrous sulfate heptahydrate (0.15% in water) were added to the kettle; this was followed by the addition of a second monomer emulsion over a period of one hour. The temperature was maintained at 74° C. Starting simultaneously with the addition of the second monomer emulsion, feeds of initiator solutions of 2.4 g. t-butyl hydroperoxide, 1.8 g. ammonium persulfate in 120.0 g. water and of 2.7 g. sodium metabisulfite in 120.0 g. water were fed into the kettle for 1.5 hours. The second monomer emulsion used to form the backbone portion of the copolymer contained 59.0 g. water, 5.3 g. of a surfactant (a 58% aqueous solution of Alipal CO-436 ® surfactant), 1.1 g. sodium acetate, 0.5 g. acetic acid, 249.3 g. vinyl acetate, 2.5 g. sodium vinyl sulfonate (25%).

After 1.5 hours, when the feeds were completed, the temperature of the reaction mixture was maintained at 74° C. for 30 minutes and then cooled 65° C. Three additions of a solution of 0.5 g. t-butyl hydroperoxide (70% in water) in 5.0 g. water and a solution of 0.25 g. sodium formaldehydesulfoxylate in 5.0 g. water were added ten minutes apart. In addition, the first solution also contained 22.5 g. ferrous sulfate heptahydrate (0.15% in water). The kettle was allowed to cool to room temperature.

The reaction product had a solids level of 29.7% and a particle size of 133 nm.

EXAMPLE 8

A graft copolymer having a backbone composition of 50 wt. % of 99.75 parts vinyl acetate/0.25 parts sodium vinyl sulfonate and a side chain composition of 50 wt. % of 99 parts butyl acrylate/1 part methacrylic acid was prepared. (Side chain DP 160 by using 0.8 wt. % crotylmercapto propionate as chain transfer agent).

A reaction kettle was initially charged with 909.8 g. water, a solution of 1.4 g. ammonium persulfate in 50.0 g. of water, and a dispersion of 168.4 g. (33% Solids) of a 42 nm polymer seed. The kettle was heated to 85° C. and a first monomer emulsion was added over a period of one hour while maintaining the temperature at 85° C. This first monomer emulsion, used to form the macromonomer side chain composition, contained 135.2 g. water, 5.0 g. sodium lauryl sulfate, 495.0 g. butyl acrylate, 5.0 g. methacrylic acid, 4.0 g. crotylmercapto propionate and 100.0 g. monomer emulsion rinse water.

Once the addition of the first monomer emulsion was completed, the temperature was maintained at 85° C. for one hour and then allowed to cool to 73° C. During the cooling step, a solution of 4.0 g. sodium acetate in 100 g. water was added to the kettle followed by the addition of an initial catalyst solution of 0.4 g. sodium bisulfite in 50 g. water, 0.9 g. ammonium persulfate in 50 g. water and 22.5 g. ferrous sulfate heptahydrate (0.15% in water).

Then a second monomer emulsion was added to the reaction kettle over a period of 3.5 hours while the temperature was maintained at 73° C. In addition, another feed of an initiator solution of 3.2 g. t-butyl hydroperoxide (25% in water) and 2.4 g. ammonium persulfate in 160 g. water and 36 g. sodium metabisulfite in 160 g. water was started at the same time as the second monomer emulsion and fed into the kettle over four hours. The second monomer emulsion used to form the backbone portion of the copolymer contained 118.0 g. water, 8.6 g. of a surfactant (a 58% aqueous solution of Alipal ® CO-436 surfactant), 2.2 g. sodium acetate, 1.0 g. acetic acid, 498.75 g. vinyl acetate and 5.0 g. sodium vinyl sulfonate (25% in water).

After the feeds were completed, the reaction mixture was cooled to 65° C. and two solutions were fed in over 45 minutes while maintaining the temperature at 65° C. The two solutions contained 1.5 g. t-butyl hydroperoxide (70% in water) in 15 g. water and 0.75 g. sodium formaldehyde-sulfoxylate in 160 g. water. The reaction mixture was then cooled to room temperature.

The reaction product had a solids level of 34.2% and a particle size of 140 nm.

EXAMPLE 9

A graft copolymer having a backbone composition of 50 wt. % of 99.75 parts vinyl acetate/0.25 parts sodium vinyl sulfonate and a side chain composition of 50 wt. % of 99 parts butyl acrylate/1 part methacrylic acid was prepared. (Side chain DP 64 by using 2.0 wt. % crotylmercapto propionate as chain transfer agent).

The same procedure was followed as in Example 8 except 10 g. of crotylmercapto propionate instead of 4.0 g was used in the first monomer emulsion.

The reaction product had a solids level of 34.5% and a particle size of 136 nm.

EXAMPLE 10

A graft copolymer having a backbone composition of 66.7 wt. % of 99.75 parts vinyl acetate/0.25 parts sodium vinyl sulfonate and a side chain composition of 33.3 wt. % of 99 parts butyl acrylate/1 part methacrylic acid was prepared. This is the same composition as the copolymer prepared in Example 5, except in this example the macromonomer was prepared by a "single shot" polymerization process.

A reaction kettle was initially charged with 505.5 g. water, 2.5 g. sodium lauryl sulfate 0.38 g. sodium acetate and 0.38 g. sodium bicarbonate. The kettle was heated to 75° C. and a first monomer solution of 247.5 g. butyl acrylate and 2.5 g. methacrylic acid was added; then 18.25 g. allylmercapto propionate and 50 g. rinse water were added to the kettle; this was quickly followed by an initiator combination of 0.7 g. ammonium persulfate in 10 g. water, 0.35 g. sodium metabisulfite in 10 g. water and 22.4 g. ferrous sulfate heptahydrate (0.15% in water). Initially, after the additions, the kettle temperature decreased to 58° C., but then increased to 87° C. over the next 6 minutes due to the exotherm. The reaction mixture was cooled to 78° C. over the next 12 minutes and then 20 g. of the second monomer emulsion was added to the kettle. The second monomer emulsion contained 115.0 g. water, 1.2 g. surfactant (a 58% aqueous solution of Alipal ® CO-436 surfactant) 1.0 g. sodium acetate, 1.0 g. sodium bicarbonate, 498.75 g. vinyl acetate and 5.0 g. sodium vinyl sulfonate. After one minute, an initiator solution of 0.44 g. ammonium persulfate in 40 g. water, 0.2 g. sodium metabisulfite in 10 g. water and 2.0 g. acetic acid in 10 g. water was added to the kettle. Then the remainder of the second monomer emulsion, along with an initiator combination of 1.6 g. t-butyl hydroperoxide and 1.2 g. ammonium persulfate in 80.0 g. water and 1.8 g. sodium bisulfite in 82.0 g. water were added to the kettle over two hours while maintaining the temperature at 74° C. Once the additions were completed the temperature was maintained at 74° C. for an additional 30 minutes. The reaction mixture was then cooled to 68° C. and a solution of 0.5 g. t-butyl hydroperoxide in 10.0 g. water, 0.25 g. sodium formaldehydesulfoxylate in 10.0 g. water and 10.0 g. ferrous sulfate heptahydrate (0.15% in water) was added. After twenty minutes, the reaction mixture was cooled to room temperature.

The reaction product had a solids level of 42.8%, a pH of 4.4, and a particle size of 134 nm.

EXAMPLE 11

Clear Film Properties

The aqueous dispersion of EXAMPLE 1 was coalesced with 15 wt % (on polymer solids) of Texanol ®. A 2-mil (dry) film from this coalesced dispersion, which had been air-dried at 25° C. for two weeks, had the following properties:

Residual texanol: 2.8 wt % (on polymer)
Pencil hardness: 5B
Tukon hardness: 1.8
Reverse impact: 40 lb./in$^2$.

After baking the above air-dried film for 1 hr. at 150° C. to remove the residual Texanol ®, the film properties were as follows:

pencil hardness: 4B
Tukon hardness: 2.3
reverse impact: 30 lb/in$^2$.

We claim:

1. A graft copolymer comprising:
a) a macromonomer side chain with a degree of polymerization of 5 to 500 of polymerized monomer units of at least one first ethylenically unsaturated monomer;
b) a backbone of polymerized units of at least one second ethylenically unsaturated monomer; and
c) a mercapto-olefin compound attached to both the macromonomer and the backbone wherein a mercapto portion of the mercapto-olefin compound is attached to the macromonomer and a vinyl portion of the mercapto-olefin compound is attached to the backbone.

2. The graft copolymer of claim 1 wherein the graft copolymer is composed of from about 10 to 90 weight percent of polymerized units derived from the at least one first monomer and from about 10 to 90 weight percent of polymerized units derived from the at least one second monomer.

3. The graft copolymer of claim 1 wherein the graft copolymer is composed of from about 30 to 70 weight percent of polymerized units derived from the at least one first monomer and from about 30 to 70 weight percent of polymerized units derived from the at least one second monomer.

4. The graft copolymer of claim 1 wherein the at least one first ethylenically unsaturated monomer is selected from the group consisting of acrylate esters and acids; methacrylate esters and acids; acrylonitrile; methacrylonitrile; acrolein; methacrolein; vinyl aromatic compounds; N-vinyl compounds; unsaturated halogenated compounds; acrylamide, methacrylamide and substituted acrylamides and methacrylamides; polymerizable unsaturated sulfonic acids and salts thereof; and vinyl esters.

5. The graft copolymer of claim 1 wherein the at least one second ethylenically unsaturated monomer is selected from the group consisting of acrylate esters and acids; methacrylate esters and acids; acrylonitrile; methacrylonitrile; acrolein; methacrolein; vinyl aromatic compounds; N-vinyl compounds; unsaturated halogenated compounds; acrylamide, methacrylamide and substituted acrylamides and methacrylamides; polymerizable unsaturated sulfonic acids and salts thereof; and vinyl esters.

6. The graft copolymer of claim 1 wherein the at least one first ethylenically unsaturated monomer is polymerized to a degree of polymerization of from about 20 to 200 to form the macromonomer side chain.

7. The graft copolymer of claim 1 wherein the mercapto-olefin compound is selected from the group consisting of;

$$HS-CH-\underset{R^1}{\underset{|}{C}}-XR, \quad HSCH_2-CH-\underset{R^2}{\underset{|}{C}}-XR,$$
$$\underset{O}{\overset{\|}{}} \qquad \underset{O}{\overset{\|}{}}$$

$$O=\underset{XR}{\underset{|}{C}} \overset{SH}{\overset{\frown}{C}}-OR^1, \quad CH_3(CH_2)_a CH(CH_2)_b-\underset{SH}{\underset{|}{C}}-XR,$$
$$\qquad \qquad \qquad \qquad \underset{O}{\overset{\|}{}}$$

$$HSCH_2(CH_2)_c-CH_2-\underset{O}{\overset{\|}{C}}-XR \text{ and } HS(CH_2)_c-CH=CH_2$$

where X is O or NR$^1$,
R$^1$ is H, or a C$_1$ to C$_{18}$ alkyl (linear or branched),
R is $-(CH_2)_c CR^2=CHR^3$, $-(CH_2)_d CH=CH(CH_2)_e CH_3$,

[cyclopentenyl with $-(CH_2)_{1-8}$, cyclopentenyl-CH$_2-(CH_2)_{1-8}$, norbornenyl or]

[bicyclic structure with O—CH$_2$CH$_2$—],

R$^2$ and R$^3$ are H or CH$_3$,
a+b is from 0 to 16,
c is from 1 to 16 and
d+e is from 1-15.

8. The graft copolymer of claim 1 wherein the mercapto-olefin compound is selected from the group consisting of allylmercapto propionate, allylmercapto acetate, crotylmercapto propionate, and crotylmercapto acetate.

9. A method of use of the graft copolymer of claim 1 in an effective amount as a compatibilizer for physical blends of at least two polymers.

10. A polymer composition comprising a graft copolymer dispersed in water wherein the graft copolymer is composed of;
   a) a macromonomer side chain with a degree of polymerization of 5 to 500 of polymerized monomer units of at least one first ethylenically unsaturated monomer;
   b) a backbone of polymerized units of at least one second ethylenically unsaturated monomer; and
   c) a mercapto-olefin compound attached to both the macromonomer and the backbone wherein a mercapto portion of the mercapto-olefin compound is attached to the macromonomer and a vinyl portion of the mercapto-olefin compound is attached to the backbone.

11. The polymer composition of claim 10 wherein the polymer composition has a solids concentration of from about 10% to about 60%, based on the total weigh of the composition.

12. The polymer composition of claim 10 wherein the graft copolymer is dispersed as particles having a size of less than 500 nanometers.

13. The polymer composition of claim 10 wherein the graft copolymer is dispersed as particles having a size of from about 50 to 200 nanometers.

14. The polymer composition of claim 10 wherein the graft copolymer is composed of from about 10 to 90 weight percent of polymerized units derived from the at least one first monomer and from about 10 to 90 weight percent of polymerized units derived from the at least one second monomer.

15. The polymer composition of claim 10 wherein the graft copolymer is composed of from about 30 to 70 weight percent of polymerized units derived from the at least one first monomer and from about 30 to 70 weight percent of polymerized units derived from the at least one second monomer.

16. The graft copolymer of claim 10 wherein the at least one first ethylenically unsaturated monomer is selected from the group consisting of acrylate esters and acids; methacrylate esters and acids; acrylonitrile; methacrylonitrile; acrolein; methacrolein; vinyl aromatic compounds; N-vinyl compounds; unsaturated halogenated compounds; acrylamide, methacrylamide and substituted acrylamides and methacrylamides; polymerizable unsaturated sulfonic acids and salts thereof; and vinyl esters.

17. The graft copolymer of claim 10 wherein the at least one second ethylenically unsaturated monomer is selected from the group consisting of acrylate esters and acids; methacrylate esters and acids; acrylonitrile; methacrylonitrile; acrolein; methacrolein; vinyl aromatic compounds; N-vinyl compounds; unsaturated halogenated compounds; acrylamide, methacrylamide and substituted acrylamides and methacrylamides; polymerizable unsaturated sulfonic acids and salts thereof; and vinyl esters.

18. The graft copolymer of claim 10 wherein the at least one first ethylenically unsaturated monomer is polymerized to a degree of polymerization of from about 20 to 200 to form the macromonomer side chain.

19. The polymer composition of claim 10 wherein the mercapto-olefin compound is selected from the group consisting of;

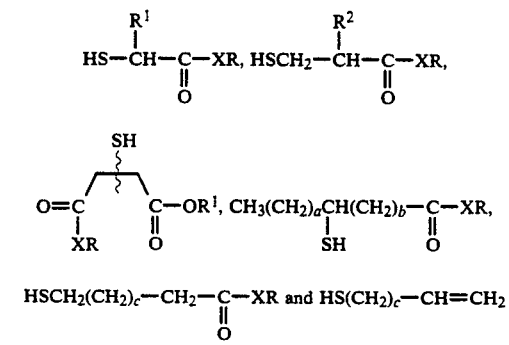

$HSCH_2(CH_2)_c-CH_2-\overset{\overset{\displaystyle O}{\|}}{C}-XR$ and $HS(CH_2)_c-CH=CH_2$ where X is O or $NR^1$.
$R^1$ is H, or a $C_1$ to $C_{18}$ alkyl (linear or branched),
R is $-(CH_2)_c CR^2=CHR^3$, $-(CH_2)_d CH=CH(CH_2)_e CH_3$,

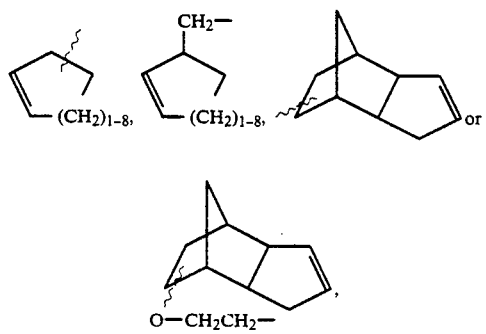

$O-CH_2CH_2-$ $R^2$ and $R^3$ are H or $CH_3$,
a+b is from 0 to 16,
c is from 1 to 16 and
d+e is from 1-15.

20. The polymer composition of claim 10 wherein the mercapto-olefin compound is selected from the group consisting of allylmercapto propionate, allylmercapto acetate, crotylmercapto propionate, and crotylmercapto acetate.

21. A water-based coating containing an effective amount of the polymer composition of claim 10.

22. An adhesive composition containing an effective amount of the polymer composition of claim 10.

23. A caulk composition containing an effective amount of the polymer composition of claim 10.

24. A mastic composition containing an effective amount of the polymer composition of claim 10.

* * * * *